(12) United States Patent
Lemoine (10) Patent No.: US 7,512,592 B2
(45) Date of Patent: Mar. 31, 2009

(54) SYSTEM AND METHOD OF XML QUERY PROCESSING

(75) Inventor: Eric T. Lemoine, San Diego, CA (US)

(73) Assignee: Tarari, Inc., San Diego, CA (US)

(*) Notice: Subject to any disclaimer, the term of this patent is extended or adjusted under 35 U.S.C. 154(b) by 488 days.

(21) Appl. No.: 10/884,663

(22) Filed: Jul. 2, 2004

(65) Prior Publication Data

US 2006/0005122 A1    Jan. 5, 2006

(51) Int. Cl.
G06F 17/30 (2006.01)
(52) U.S. Cl. .................. 707/3; 707/2; 707/4; 707/5; 707/100; 707/102
(58) Field of Classification Search .............. 707/2, 707/3, 4, 10, 5, 100, 102
See application file for complete search history.

(56) References Cited

U.S. PATENT DOCUMENTS

| | | | |
|---|---|---|---|
| 5,857,212 | A | 1/1999 | Van de Vanter |
| 2001/0013047 | A1 | 8/2001 | Marques |
| 2003/0163285 | A1 | 8/2003 | Nakamura et al. |
| 2004/0010752 | A1 | 1/2004 | Chan et al. |
| 2004/0172234 | A1 | 9/2004 | Dapp et al. |
| 2004/0225999 | A1 | 11/2004 | Nuss |
| 2005/0203957 | A1* | 9/2005 | Wang et al. ............... 707/104.1 |

OTHER PUBLICATIONS

Onizuka, Makoto. "Light-Weight XPath Processing of XML Stream with Deterministic Automata." *CIKM'03*, Nov. 3-8, 2003: 342-349.

Olteanu, D., et al. "XPath: Looking Forward." Institute for Computer Science and Center for Information and Language Processing, University of Munich, Germany:1-15, (2002).

Grust, Torsten. "Accelerating XPath Location Steps." *ACM SIGMOD*, Jun. 4-6. 2002: 109-120.

Helmer, Sven, et al. "Optimized Translation of XPath into Algebraic Expressions Parameterized by Programs Containing Navigational Primitives." Proceedings of the 3rd International Conference on Web Information Systems Engineering, 2002: 1-10.

Manos, Papagelis. "Optimized Translation of XPath into Algebraic Expressions Parameterized Containing Navigational Primitives of Sven Helmer, Carl-Christian Kanne and Guido Moerkotte." Heraklion, University of Crete, Dec. 2, 2003: 1-32.

(Continued)

*Primary Examiner*—Hung Q Pham
(74) *Attorney, Agent, or Firm*—Knobbe, Martens, Olson & Bear LLP (57) ABSTRACT

A method of processing queries, e.g., XPath expressions, related to an XML document includes generating a plurality of tokens based on the contents of the XML document. At least one query expression is compiled to a first plurality of query nodes defining a tree. A plurality of lookup tables may be configured to relate each of the first plurality of query nodes by a symbol. Each token is processed by looking up the query nodes indexed by a symbol matching the token in one of the plurality of lookup tables, marking each of the related query nodes, and indicating a match if each of the first plurality of query nodes of the at least one query expression is marked. A system for performing the method includes a tokenizer, an expression compiler, and an engine module.

28 Claims, 7 Drawing Sheets

OTHER PUBLICATIONS

Snoeren, Alec C., et al. "Mesh-Based Content Routing using XML." MIT Laboratory of Computer Science: 1-14, (Oct. 2001).

Vion-Dury, Jean-Yves. "XPath on Left and Right Sides of Rules: Toward Compact XML Tree Rewriting through Node Patterns." *DocEng '03*, Nov. 20-22, 2003: 19-25.

Nicola, Matthias, et al. "XML Parsing: A Threat to Database Performance." *CIKM'03*, Nov. 3-8, 2003: 175-178.

Su, Hong, et al. "Raindrop: A Uniform and Layered Albegraic Framework for XQueries on XML Streams." *CIKM'03*, Nov. 3-8, 2003: 279-286.

Miklau, Gerome, et al. "Containment and Equivalence for a Fragment of XPath." Journal of the ACM, vol. 51, No. 1, Jan. 2004: 2-45.

Chan, Chee-Yong, et al. "Efficient filtering of XML documents with XPath expressions." The VLDB Journal, 2002, vol. 11: 354-379.

Deschler, Kurt, et al. "MASS: A Multi-Axis Storage Structure for Large XML Documents." *CIKM'03*, Nov. 3-8, 2003: 520-523.

Suciu, Dan. "Distributed Query Evaluation on Semistructured Data." ACM Transactions on Database Systems, vol. 27, No. 1, Mar. 2002: 1-62.

Murata, Makoto, et al. "XML Access Control Using Static Analysis." *CCS '03*, Oct. 27-31, 2003: 73-84.

* cited by examiner

SYSTEM AND METHOD OF XML QUERY PROCESSING

RELATED APPLICATIONS

This application is related to, and incorporates by reference in its entirety, co-pending U.S. patent application Ser. No. 10/831,956 entitled "SYSTEM AND METHOD OF TOKENIZING DOCUMENTS," filed Apr. 26, 2004.

BACKGROUND OF THE INVENTION

1. Field of the Invention

The invention relates to a system and method for processing queries directed to structured documents. In addition, the invention relates to a system and method for processing a set of queries against an extensible markup language (XML) document.

2. Description of the Related Art

Hypertext markup (HTML) documents have become one of the most common forms of data interchanged over the Internet. HTML provides a document with a mechanism to describe how the document relates to other documents, through hyperlinks. HTML also provides mechanisms for describing how to visually present data including text formatting and lists or tables. Many internet applications require the automated exchange of documents containing data between two or more computers. A common document format that allows for the description of the logical structure and interrelationships of the data within a document is thus required. However, HTML does not provide a general mechanism for an HTML document to express the logical structure and interrelationships of the underlying data represented by the HTML document.

To address this shortcoming, extensible markup language (XML) has been developed. XML provides a mechanism to represent data in way that retains the logical structure and interrelationship of the underlying data. Thus, an XML document, rather than merely being a human readable representation of data, comprises a database. Moreover, an XML document may be constructed to conform to a document type declaration (DTD). A DTD is a formal description of a particular type of document. It sets forth what elements the particular type of document may contain, the structure of the elements, and the interrelationship of the elements. XML documents, particularly those which conform to a well-known or standardized DTD, thus provide a convenient means of data exchange between computer programs in general, and on the Internet in particular.

One typical method of processing XML documents is based on performing queries against the XML documents to locate information within the documents. XPath is a standardized language for expressing XML queries. See e.g., JOHN W. SIMPSON, XPATH AND XPOINTER (O'Reily, 2002), herein incorporated by reference in its entirety. XPath queries are a string of characters which represent hierarchical descriptions of elements and attributes for which an XML document is to be searched. An XPath query expression includes one or more path components, or subexpressions. The structure of an XML document may be represented by a directed graph or a tree in which the elements of the document are nodes. Thus, the result of an XPath query is generally a set of nodes within the directed graph.

One model for performing XPath queries is based on the Document Object Model (DOM) standard. Typically, DOM processes an entire XML document to produce a tree representing each of the elements in the document and the interrelationship between those documents. An XPath query can be processed to produce a finite automaton, a form of state machine. The finite automaton processes the graph of the DOM model to find a result for the corresponding XPath query. Both deterministic finite automata (DFA) and nondeterministic finite automata (NFA) may be produced for controlling the processing of DOM models.

However, for large XML documents, processing using DOM may not be practical due to the necessary memory and related resource constraints required by DOM. For example, due to the overhead of the textual formatting of attributes and elements, XML documents typically consume an amount of memory that is on the order of 10 times greater than the amount of memory necessary to represent underlying data in a compact binary format. Moreover, a DOM tree of an XML document typically requires an amount of memory that is on the order of 10 times greater than the amount required for the XML document itself. Thus, processing of large XML documents may require disproportionately large amounts of memory.

Moreover, server applications, such as, for example, web servers or email servers, may need to process many large XML documents at once. In these server environments, the large memory requirements of DOM trees also negatively impact processing performance in at least two ways. First, if the amount of physical memory is exhausted, system performance may be slowed as documents are paged out to slower storage, such as disk drives. Second, most modern computer processors operate at peak efficiency only when they are consistently performing operations using data that is in a cache memory. Cache memory is typically much more limited than the physical memory of a server. If a server is concurrently processing several large XML documents using DOM, little of each document may remain in the cache memory. The resulting high level of cache misses while processing XPath queries tends to severely degrade overall system performance in systems processing large XML documents.

Another system and application program interface (API) for processing XML is SAX (Simple API for XML). SAX presents the XML document as a serialized stream of events to be processed using handler functions rather than a DOM tree that is processed using, for example, a DFA. SAX thus requires only a stack, having a memory requirement that varies with the depth of the structure of elements in the XML document, rather than a tree, having a memory requirement that varies with the larger number of elements in the XML document. However, SAX provides only stream-style sequential access to the contents of a document. Moreover, its event-based structure is more difficult for programmers to use and applications written to use SAX tend to either perform only simple serial processing, or become complicated and difficult to maintain.

As XML usage increases, the need for efficient processing of XML queries, including XPath queries, also increases. One solution is to offload processing of XML queries to dedicated content processors. However, the memory requirements of DOM processing, and the difficulty of using SAX models have made cost effective implementation of content processing for XML queries difficult. Thus, simpler, yet resource efficient systems and methods of processing XML documents are needed.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Embodiments" one will understand how the features of this invention provide advantages that include faster and more efficient processing of large XPath queries in, e.g., content processors.

One embodiment is a method of checking whether an XML document is well formed. The method may include receiving contents of the XML document. A plurality of tokens may be generated based on the contents of the XML document. A depth of each of the plurality of tokens is determined. A maximum depth of the XML document is calculated based on the depths of each of the elements. The XML document may be rejected if the maximum depth exceeds a predetermined depth.

Another embodiment is a method of processing queries of an XML document. The method includes generating a plurality of tokens based on contents of the XML document. The tokens may form a sequence of tokens. At least one statistical measure of the contents of the XML document is generated. At least one query expression is compiled to a first plurality of query nodes. The first plurality of query nodes may define a tree. Each of the first plurality of query nodes includes at least one symbol. Each of the first plurality of query nodes is assigned to one of a plurality of categories defined by XML. A plurality of lookup tables is configured to store the first plurality of query nodes and configured to relate the symbol of each of the first plurality of query nodes to a second plurality of query nodes. Each of the plurality of lookup tables is associated with one of the plurality of categories defined by XML. Each of the first plurality of query nodes is stored to the one of the plurality of lookup tables associated with the assigned one of the plurality of categories. The plurality of tokens is processed. The processing of each token includes assigning each token to one of the plurality of categories defined by XML. The second plurality of query nodes having a symbol matching the token is retrieved from the one of the plurality of lookup tables associated with the assigned one of the plurality of categories. Each of the second plurality of query nodes is marked. A match may be indicated if each of the first plurality of query nodes is marked.

A further embodiment is a method of generating a token based on contents of the XML document. The method includes compiling at least one query expression to a data structure. The data structure includes a first plurality of query nodes. Each of the first plurality of query nodes includes at least one symbol. Each of the first plurality of query nodes is assigned to one of a plurality of categories defined by XML. The token is processed, the processing including assigning the token to one of the plurality of categories defined by XML. A second plurality of query nodes is retrieved from the data structure. The token matches the symbol of each of the second plurality of query nodes and the one of the plurality of categories assigned to the token matches the one of the plurality of categories assigned to each of the second plurality of query nodes. Each of the second plurality of query nodes is marked. A match may be indicated if each of the first plurality of query nodes is marked.

Another embodiment is a system for processing queries of an XML document. The system includes a tokenizer module configured to generate a token based on the contents of the XML. An expression compiler module is configured to compile at least one query expression a first plurality of query nodes. Each of the first plurality of query nodes includes at least one symbol. The expression compiler is configured to assign each of the first plurality of query nodes to one of a plurality of categories defined by XML. An engine module is configured to assign the token to one of the plurality of categories defined by XML. The engine module is also configured to retrieve a second plurality of query nodes. The token matches the symbol of each of the second plurality of query nodes and the one of the plurality of categories assigned to the token matches the one of the plurality of categories assigned to each of the second plurality of query nodes. The engine module is further configured to mark each of the second plurality of query nodes and to indicate a match if each of the first plurality of query nodes is marked.

Yet another embodiment is a system for processing queries of an XML document. The system may include means for generating a token based on contents of the XML document; means for compiling at least one query expression to a first plurality of query nodes, wherein each of the first plurality of query nodes comprises at least one symbol; means for assigning each of the first plurality of query nodes to one of a plurality of categories defined by XML; and means for processing the token. The means for processing is configured to assign the token to one of the plurality of categories defined by XML, retrieve a second plurality of query nodes wherein the token matches the symbol of each of the second plurality of query nodes and the one of the plurality of categories assigned to the token matches the one of the plurality of categories assigned to each of the second plurality of query nodes; mark each of the second plurality of query nodes; and indicate a match if each of the first plurality of query nodes is marked.

Another embodiment is a content processor containing storing software instructions defining a process which when executed causes a processor associated therewith to perform the acts including generating a token based on contents of the XML document. At least one query expression is compiled to a first plurality of query nodes. Each of the first plurality of query nodes includes at least one symbol. Each of the first plurality of query nodes is assigned to one of a plurality of categories defined by XML. The token is processed. This processing includes assigning the token to one of the plurality of categories defined by XML. A second plurality of query nodes is retrieved. The token matches the symbol of each of the second plurality of query nodes and the one of the plurality of categories assigned to the token matches the one of the plurality of categories assigned to each of the second plurality of query nodes. Each of the second plurality of query nodes is marked. A match is indicated if each of the first plurality of query nodes is marked.

Another embodiment is a method of searching for a data item in a database. The method may include transforming each of a plurality of entries in the database into a plurality of XML queries. The data item is represented as an XML document. The plurality of XML queries is matched against the XML document. At least one of the matching XML queries may be reverse associated to a corresponding one of the plurality of entries in the database.

Yet another embodiment is a method of performing a plurality of XPath queries on an XML document having a plurality of namespaces. The method includes executing the plurality of XPath queries on the XML document. The act of executing the plurality of XPath queries is performed with reference to the plurality of namespaces.

DETAILED DESCRIPTION OF EMBODIMENTS OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

Structured types of documents are typically characterized by their hierarchical, tree type construction, which is defined by start and end tag pairs. A start tag is denoted by the form <name> and its corresponding end tag is </name>. In XML, each named start tag must have a corresponding end tag with the same name. Any pair of tags may contain an unlimited number of other pairs. Also, any start and end tag pair and their contents may be nested to arbitrary depth. However, any given tag pair must be completely contained within another pair of tags or be completely outside, partial overlap is not allowed. Thus "<tag1> content1 <tag2> content2</tag2></tag1>" is a legal construct in which tag2 is the name of a child element of the element named tag1. This fragment has an implicit tree structure with a depth of 2. It is also correct to have "<tag1> content1 </tag1><tag2> content2</tag2>" in which the tag1 element is a sibling of the tag2 element. This fragment has a depth of 1. The following is not legal: "<tag1><tag2> content </tag1></tag2>" because the tag2 element is no longer completely contained within the tag1 element, nor completely outside of it. HTML and SGML allow some tags to be optional when it is implicitly clear from the structure of the document where the implied tags would be. Nevertheless, they also have a hierarchical tree type structure.

A system designed to process structured documents is preferably able to accommodate each successive document having a completely different structure from the document before it. This adds complexity to managing the memory in which the data structure representing the document is stored. This may be addressed in the parsing phase of processing using time-consuming memory allocation mechanisms. However, it has been found that by using certain characteristics of the structure of a document being processed, e.g., number of elements, number of attributes, and the maximum depth of the tree, which may be obtained before parsing begins. In one embodiment, these statistics may be calculated during an earlier lexical analysis of the document, XPath processing may be performed more efficiently and with simplified, e.g., static, memory allocation of the required data structures. Moreover, it has been found that by compiling a set of XPath queries into easily traversed data structures, very large sets of XPath queries can be processed, essentially concurrently, by making a token by token traversal of these data structures.

In particular, it has been found that data driven processing based on traversal of data structures is substantially more efficient than approaches such as DOM. Further, statistics regarding the contents of an XML document may be used to predict processing memory usage such that data structures associated with the processing may be statically allocated before processing. Moreover, memory usage has been found to scale approximately linearly with the size of the XML document. This contrasts with systems such as DOM, for which memory usage increases in a geometric relationship with the size of the document.

Figure 1:
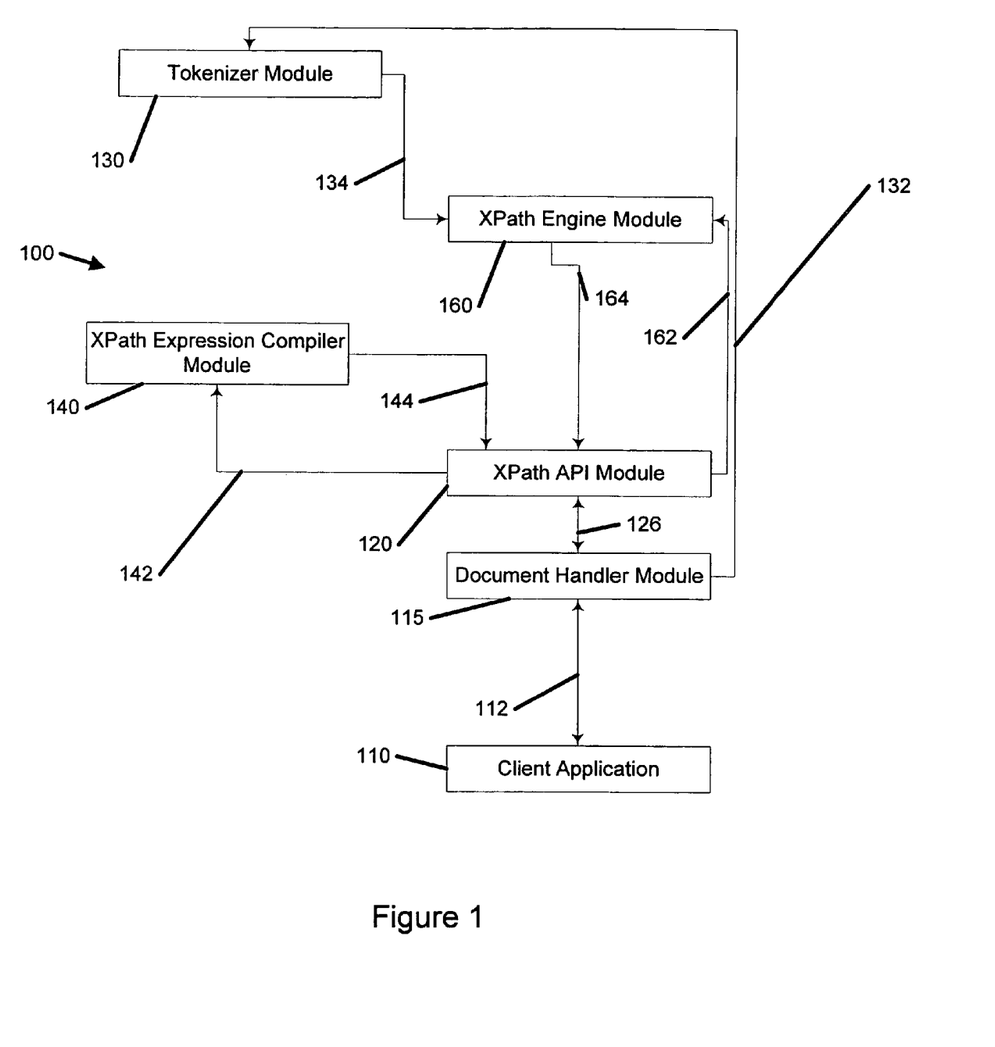
FIG. 1 is a block diagram depicting one embodiment of a system for efficiently processing XPath queries.

FIG. 1 depicts a block diagram of one embodiment of a system 100 for processing XPath queries on an XML document. The system 100 may be driven by a client application 110. The client application 110 is in communication with a document handler module 115 via an interface 112. The document handler module 115 may act as a high level interface to the system 100. In particular, it may provide a high level interface to an XPath API (application programmer interface) module 120 via interface 126 and a tokenizer module 130 via interface 132. The XPath API module may provide functions to define a set of XPath queries, to process query results, and to provide lower level control over associated XPath modules, including an XPath expression compiler module 130 and an XPath engine module 160 via interface 162. The tokenizer module 130 receives the contents of the XML document via the interface 132 and produces a stream of tokens via interface 134 that represent lexemes, groups of syntactically relevant symbols in the document, for use by the XPath engine module 160. The XPath expression compiler module 140 receives a set of XPath queries from the XPath API module 120 via interface 142 and returns a set of compiled data structures via the interface 144. Finally, the XPath engine module 160 receives these data structures via interface 162 and returns the results of executing the queries on the XML document via the interface 164. The specific data or data structures that may be communicated over each of the interfaces 112, 132, 134, 142, 144, 162, and 164 is discussed in more detail below.

It is to be appreciated that each of the modules comprises various sub-routines, procedures, definitional statements, and macros. Each of the modules may be separately compiled and linked into a single executable program. The following description is used for convenience to describe the functionality of one embodiment of a system. Thus, the processes that are performed by each of the modules may be redistributed to one of the other modules, combined together in a single module, or made available in, for example, a shareable dynamic link library. It is to be appreciated that the modules may be produced using any computer language or environment, including general-purpose languages such as C or FORTRAN. Furthermore, in one embodiment, interfaces between the modules may be implemented in terms of a set of function calls, e.g., an application program interface. In other embodiments, other inter program communication methods such as remote procedure calls, a client-server interface, or other methods of inter-program communication that are known to those of skill in the art may be employed.

Figure 2:
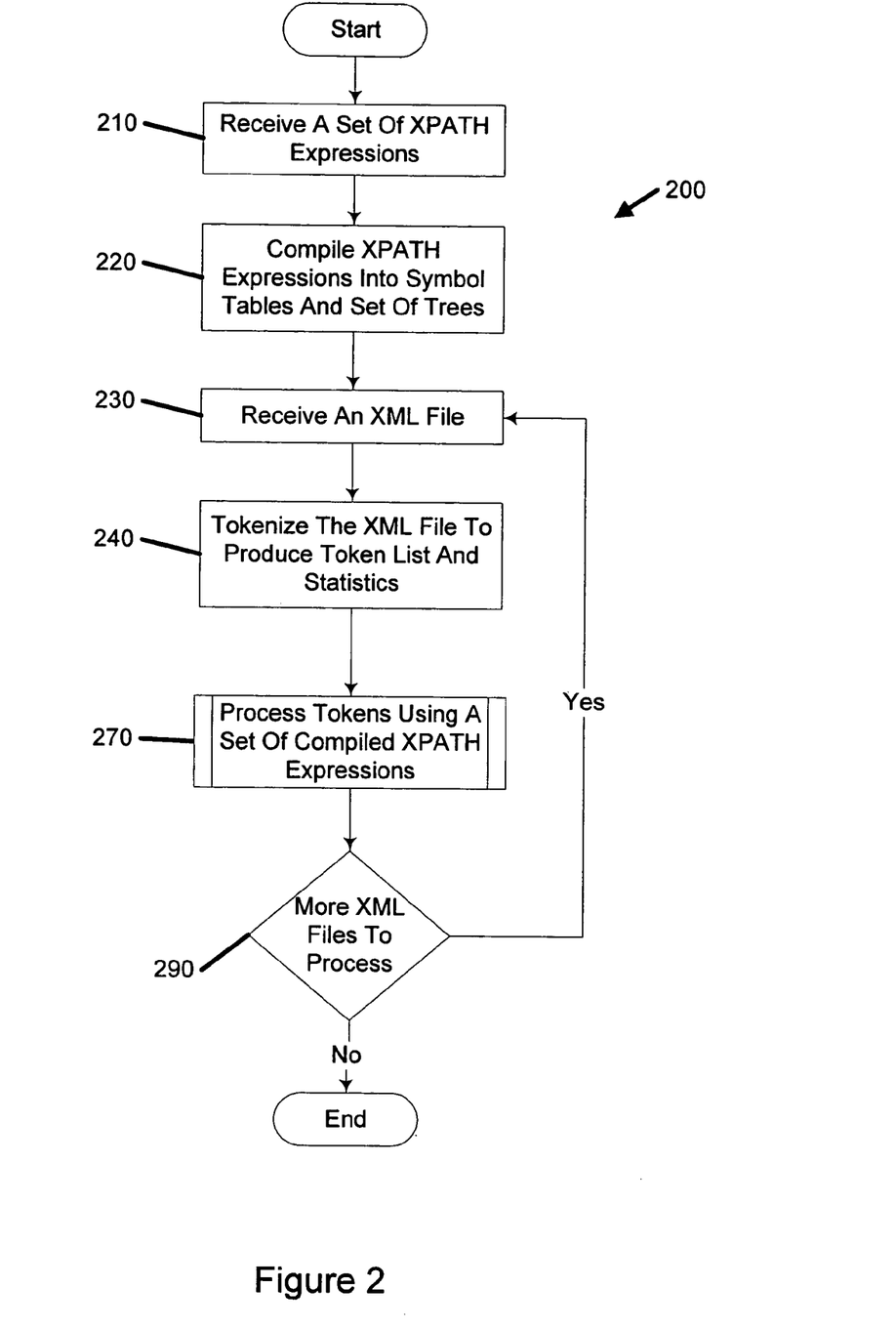
FIG. 2 is a flow chart depicting one embodiment of a method of processing queries with respect to XML documents such as in the system depicted in FIG. 1.

FIG. 2 is a flow chart depicting one embodiment of a method 200 of processing XML documents, e.g., using the system 100. It is to be appreciated that depending on the embodiment, additional steps may be added, others removed, steps merged, or the order of the steps rearranged. The method 200 begins from a step 210 where a set of XPath expressions or queries is received by the document handler module 115 via interface 112 from a client program 110. In one embodiment, the document handler module 115 forwards the XPath expressions to the XPath API Module via interface 126.

Next, at a step 220, the XPath expressions are compiled into a data structure. In the system 200, the expressions may be sent via interface 162 to the XPath expression compiler module 140 for compiling and the resulting data structures returned via interfaces 112, 126, and 144 to the client program. In one embodiment, this data structure includes a set of trees of query nodes representing each of the XPath query expressions and one or more symbol tables that index the query nodes based on symbols associated with the query nodes. A discussion of the data structures compiled from the XPath query is presented hereinafter with reference to FIG. 3.

It is to be appreciated that the steps 210 and 220 may be performed repeatedly by a client application 110 for any number of different sets of XPath expressions. The resulting compiled data structures may be saved until processing of the XPath queries with respect to a specific XML document is requested by the client application 110.

Moving on to a step 230, an XML document is received by the document handler module 115 from the client program 110 via interface 112. Next, at a step 240, the document handler module 115 passes the document via interface 132 to the tokenizer module 130 which performs lexical analysis, or tokenization, on the XML document to produce a sequence, or list, of tokens. It is to be appreciated that tokenizing may be performed using any lexical analysis system or method, such as those that are well known in the art. In one embodiment, the tokenizer module 130 may include a tokenizer as described in the co-pending patent application "SYSTEM AND METHOD OF TOKENIZING DOCUMENTS," previously incorporated by reference.

It has been found that compiling statistics during tokenizing can improve performance of query processing. Preferably, a set of statistics regarding the occurrence of tokens in the XML document is also produced by the tokenizer module 130. More preferably, these statistics include, for example, the maximum depth of the XML tree defined by the document, XML namespaces defined in the document, and the number of recurrences of each item. After tokenizing, the tokens may be passed directly to the XPath engine module 164 via an interface 134.

Next at a step 270, the XPath engine module 160 processes the tokens sequentially using the XPath expression compiled data structures 300. One embodiment of this step is described in more detail below in connection with FIG. 4. Match results may be returned via interface 164 to the XPath API module and then to the client application 110 via interfaces 126 and 112. A match generally comprises the matched query expression and the position of at least one matching token in the XML document.

Moving on to a step 290, if it is determined in step 290 that there are additional XML documents to be processed, processing of the method 200 returns to the step 230 and functions as described above. Otherwise, the method 200 terminates. In one embodiment, the client application 110 may provide the additional XML documents to the document handler 115 for parsing by the XPath engine module 160 using the same compiled query structure 300 for each of the additional documents.

Figure 3:
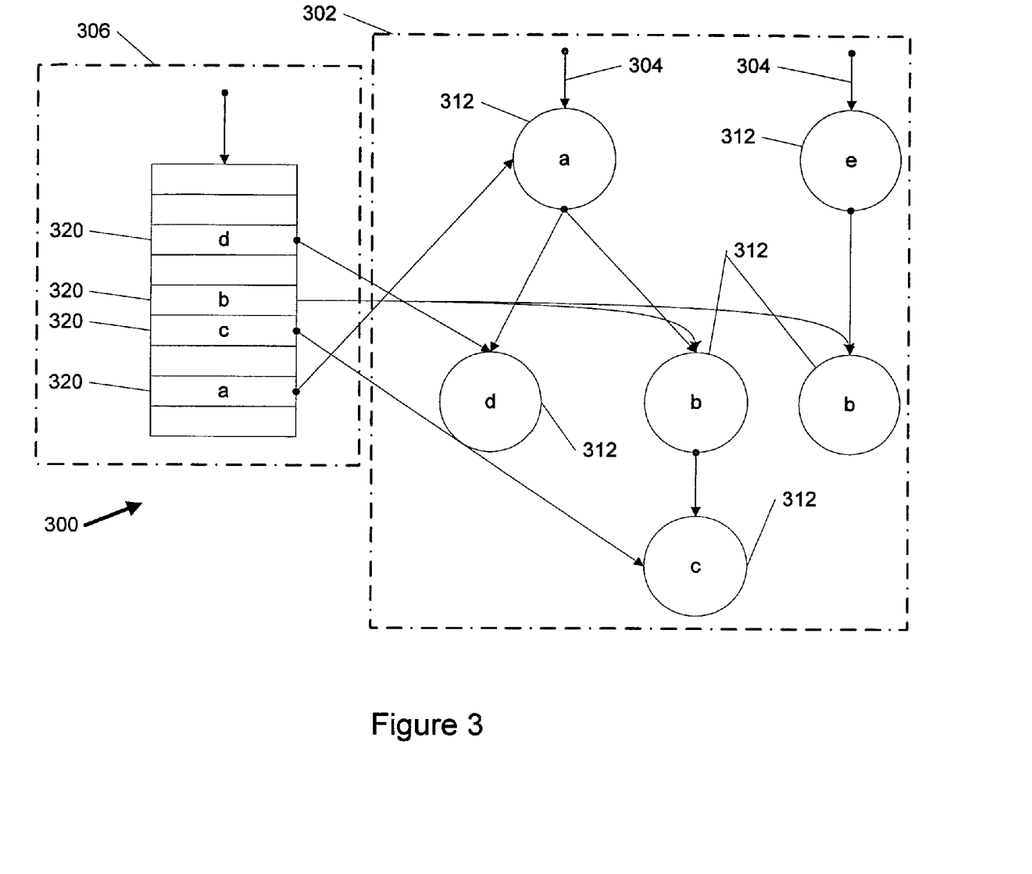
FIG. 3 is a block diagram of data structures used in one embodiment of the method of FIG. 2.

FIG. 3 is a data structure diagram depicting one embodiment of the data structures 300 resulting from compiling a simple XPath query as is done in step 220 of the method of FIG. 2. The XPath compiler module 140 compiles the queries into the data structures 300 that include, in this embodiment, a set of trees 302. The set of trees may include one tree 304 for each of the XPath query expression that comprises the XPath query. An XPath query expression includes one or more hierarchical path components that serve to define a query with respect to the hierarchical structure of an XML document. Each path component is itself an expression that includes one or more symbols. In the simple example of FIG. 3, a single set of XPath queries of the form "/a/b/c/d" and "e/b" is depicted, resulting in a two trees 304. The structure of the trees 304 is formed by a set of linked query nodes, 312. In the depicted example of FIG. 3 these nodes 312 correspond to XPath path components a, b, c, d, and e, respectively. The nodes 312 of each tree 304 may be linked together to form the tree 304 using pointers or any other method of tree representation known in the art. It is to be appreciated that more complex XPath queries may include a group or set of queries that are compiled into a corresponding forest of trees 304.

In one embodiment, the trees may be compiled into a simple forest 304. Preferably, however, the forest of trees 304 is optimized to merge duplicate nodes to improve the performance of later processing steps by reducing the number of nodes that are traversed. In one embodiment, a two pass procedure is performed to optimize the tree. In the first pass, the statistics about the symbols in the nodes of the trees are gathered in order to determine common prefixes. A second traversal of the trees is performed in which new optimized trees are formed to have the common prefixes are merged. It is to be appreciated that this tree compression can be performed using any lossless compression algorithm, such as numerous ones that are well-known in the related art.

Each of the query nodes of the set of trees is generally associated with a symbol (e.g. "a"). Thus, in addition to the trees 302, the XPath expression compiler 140 may compile the XPath queries into a data structure that indexes each of the query nodes in the trees by the symbols associated with each path component and corresponding node. In one embodiment, this index includes one or more lookup, or symbol tables 306. The symbol tables 306 act as lookup tables mapping an entry 320 for symbol, e.g. "a," to a list of XPath query nodes 312 in the set of trees 302. In the exemplary data structure of FIG. 3, the entry 320 for the symbol "a" indexes that symbol to one corresponding tree node 312 in one tree 304 while that entry 320 for the symbol "b" indexes that symbol with two tree nodes 312 in two respective trees 304. Preferably, a plurality of symbol tables 306 are produced by the compiler module 140 corresponding to different types of XPath expression items. More preferably, symbol tables 306 are produced for lookup of XML elements, attributes, namespaces, and values found in the XPath expressions. In one embodiment, the symbol tables 306 may also include a table of XML namespace prefixes. Processing of the queries with respect to XML documents may include receiving each token in the documents and traversing the data structures 300 as described below.

Figure 4:
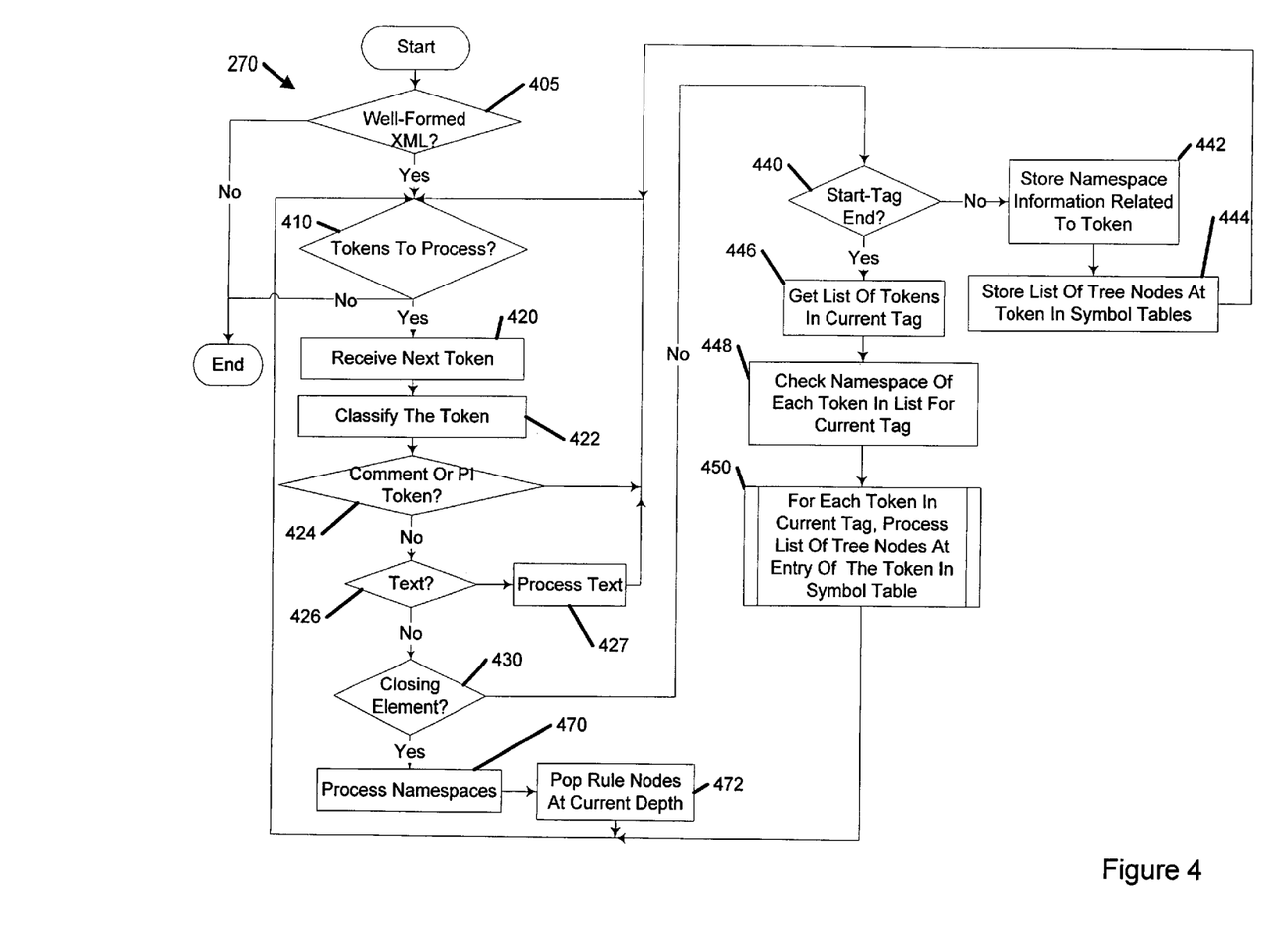
FIG. 4 is a flow chart depicting portions of one embodiment of a method of processing XML documents of FIG. 2.

FIG. 4 is a more detailed flow chart depicting one embodiment of the process of step 270 of the method 200. In one embodiment, the XPath engine module 160 receives the tokens to process for an XML document from the tokenizer module 130 and receives the compiled XPath expression data structures 300 from the XPath API module 120. The process 270 then includes token by token processing of the tokens by the XPath engine module 160.

Beginning at a decision step 405, the method 200 conducts a test of the document to check whether the document is well-formed according to the XML specification. In a content processor, for example, for processing email messages that include XML content, the ability to quickly check and reject malformed documents without further processing is advantageous. Checking for whether the XML document is well-formed may include checking whether the XML document is lexicographically correct in terms of syntactic elements. In one embodiment, this check includes comparing the maximum depth of the XML tree to a preselected maximum depth. Preferably, this maximum depth information is received as a token that is produced by the tokenizer module 130. XML documents whose depth exceeds the preselected maximum may thus be rejected to prevent malformed, or even maliciously calculated, XML documents having very deep depths from clogging a system. For example, in a content processor that is part of an email system, it may be advantageous to screen out messages containing malformed XML documents that have excessively deep nesting of elements to prevent the processing of such documents from adversely affecting email system throughput. In one embodiment, if the XML document fails check for being well-formed, processing ends.

If a well-formed XML document is confirmed in the step 405, the method moves to a step 410, wherein the sequence of tokens is examined to determine whether the end of the token sequence for the XML document has been reached. If there are no more tokens to process, processing terminates. Otherwise, processing of the tokens continues to a step 420 where the next token is received from the sequence of tokens in the XML document. Next, at a step 422, the token is classified in terms of XML items. The classifications of token types may include elements, attributes, namespaces (e.g., URI's), values of attributes, other XML syntax such as start or end of element tags, or text of elements. Preferably, the classifications includes whether the token is a namespace prefix.

Next at a decision step 424, if the token is a comment or processing instruction, further processing does not need to be performed on the token and processing returns to step 410. If the token is not a comment or processing instruction token, the method 270 proceeds from step 424 to step a 426. In the step 426, if it is determined that the token is text, the method 270 proceeds to step 427, alternatively if it is found that the token is not a text token, the method 270 moves to step 430.

Next at a step 430, the token classification is tested to determine if the token indicates the end of the current XML element. If not, the method 270 proceeds to a step 440. Otherwise, if the token does indicate the end of an XML element, the method 270 proceeds to a step 470.

If the end of an XML element has been detected in the step 430, the method moves to the step 470, wherein namespaces related to the current element are processed. In particular, a data structure, such as a tree, is maintained by the XPath engine module 160 to track namespaces. Each node of the namespace tree may include the prefix, the URI/URN, and the scope of the namespace, i.e. a pointer to the enclosing namespace. Namespaces in an XML document naturally define a tree structure, and are thus easily represented by a tree by the XPath engine module 160. At the step 470, any new namespaces that have been declared within the element are added to the namespace data structure.

Next at a step 472, data structures processed at the current element level are updated. For example, query nodes 312 are marked as having been visited, such as at step 462, as discussed below. These marked nodes are maintained on a data structure, such as a stack, and are popped off the stack and "unmarked" at the step 472. In one embodiment, this unmarking includes decrementing a count associated with the query node 312. The method 270 then proceeds back to the step 410 and functions as describe above.

Returning to the step 440, a decision step, if the token is the end of a start tag, e.g., a ">" at the end of a start tag, the method 270 proceeds to a step 446. If the token is not a start-tag end, the method 270 moves to a step 442. At the step 442, if the token is related to namespacing, the token and/or other namespace data are stored in a data structure related to the current XML element being processed. Also, if the token indicates the beginning of a new XML element, this element data structure may be pushed onto, e.g., a stack, or any other suitable data structure and the data structure for storing the new current XML structure may be initialized. Moving to a step 444, the index data structures 300 are accessed to determine if the current token matches any symbols in the corresponding query nodes 312. In one embodiment, this includes looking for the token in the symbol table 306 that corresponds with the classification of the token assigned at the step 430. For example, if the token is an XML element, the element symbol table 306 is used to identify any query nodes 312 that are indexed by a symbol matching the token. This matching activity may include a character by character comparison, or other symbol matching algorithms may be used, including those that are well known in the art. Each, if any, of the tree nodes identified by the index is stored, for example, in the current stack frame, and related to the current token. The information related to the current token may be further related to the current tag in the stack frame. The method 270 then proceeds back to the step 410 and functions as describe above.

Returning to the step 446, a list of tokens in the current tag is retrieved, for example, using the relation to the current tag stored on the stack in step 444. Next at step 448, the namespace of the each token in the list of tokens in the current tag is checked, if appropriate for the token type. Using a tree that describes the current namespace scope, the maintenance of which is described in more detail below with respect to the step 470, the namespace of the token is checked by walking up the tree until a declaring namespace is identified. In one embodiment, the namespace tree is stored as a memory array or vector that stores the outermost scope at the first index into the array and the innermost scope at the highest index into the array. Checking the namespace of a token may thereby simply include traversing the array from highest to lowest index until a declaring scope is found. In one embodiment, if no declaring scope is found, the XPath engine module 160 places an indicator in a memory location that the current XML document is not well formed. In another embodiment, not shown, the method 270 may proceed to an end state if the XML document is found not to be well formed.

Proceeding to step 450, each token in the list for the current tag is processed. In particular, the list of tree nodes stored at step 444 with respect to each of the tokens is processed. The processing that occurs in step 450 for the information stored for each token in the tag for which the start-tag end token relates is depicted in more detail in FIG. 4A and will be described more fully below.

Figure 4A:
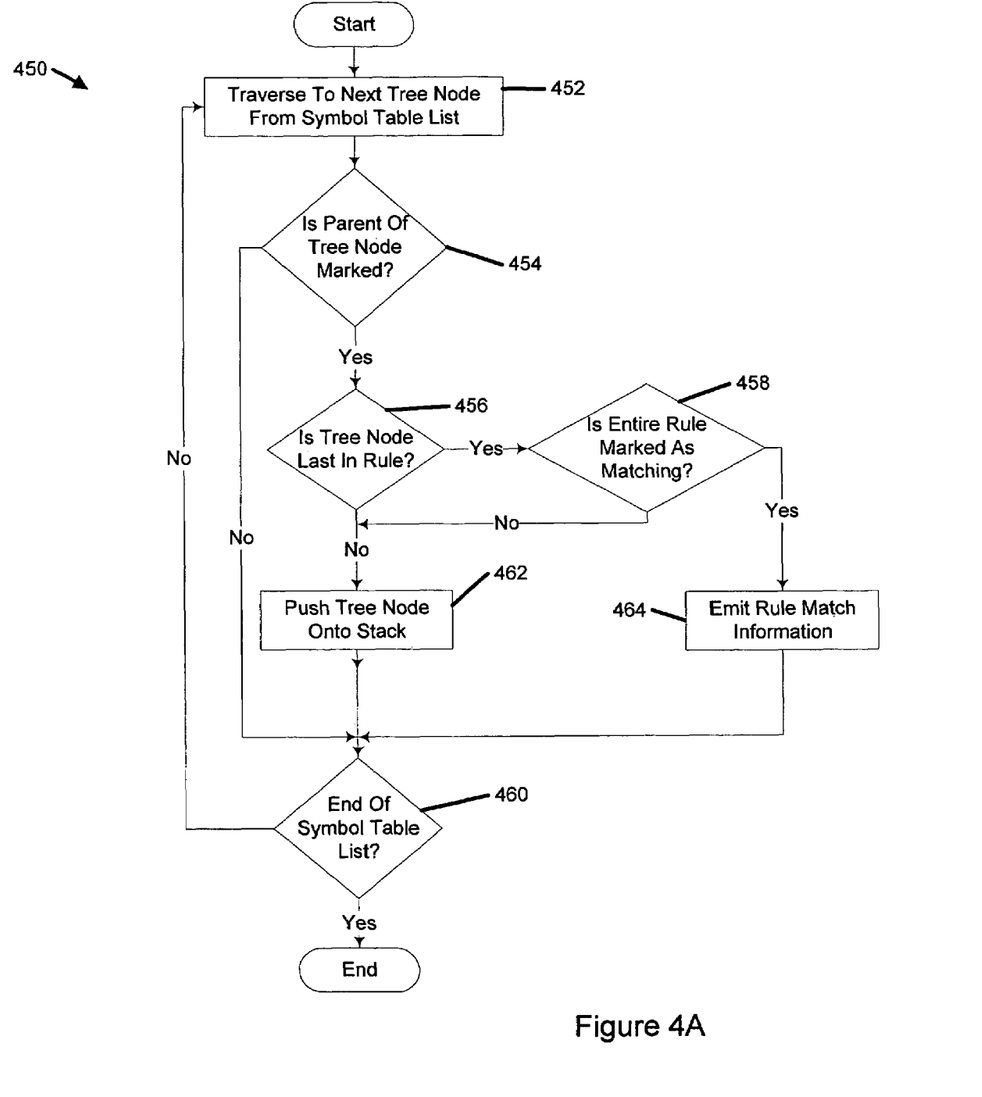
FIG. 4A is a flow chart depicting details of one step of the method of FIG. 4.

Referring now to FIG. 4A, it is seen that the subprocess of the step 450 begins at a step 452 in which the list of tree nodes at the entry 320 of the symbol table 306 is traversed to the next query node 312 that matches the token. Moving to a step 454, the parent of the matching node 312 is checked to determine if it has been marked. If the parent has been marked, or the matching node 312 is the root node of the corresponding XPath expression, then the XPath query expression corresponding to the matching node 312 is a possible match. Thus, the matching node 312 is marked and the subprocess 450 proceeds to a step 456. If the parent did not match, then the subprocess 450 proceeds to a step 460 which will be described below.

In the step 456, the matching node 312 is checked to determine if it is the last node in the tree 314 corresponding to a tree. If the matching node 312 is the last node remaining to be matched in the tree 304 corresponding to an XPath expression, processing proceeds to a step 458. If not, the subprocess 450 proceeds to a step 462 where information including the matching node 312 is stored and the matching node 312 is marked as being a match. In one embodiment, this mark may be a count that is incremented. In one embodiment, the XPath engine 160 stores the query node 312 and the related information to a stack. The subprocess 450 then proceeds to the step 460.

Referring now to the step 458, the query tree 304 corresponding to the matching node 312 is checked to see if the entire query is marked, i.e. the query is a match. If so, the subprocess 450 proceeds to the step 464, where information relating the match is indicated, otherwise processing moves to the step 462 and proceeds as described above. In the step 464, in one embodiment, the XPath engine 160 indicates a match by marking a specified memory location, storing data related to the match, or sending such data on to other software for further processing. In one embodiment, data, such as the location of the current token and information identifying the XPath query, is stored sent to indicate the match. After the match is indicated, the subprocess 450 proceeds to the step 460.

Moving on to the step 460, the list at the symbol table entry 320 is checked to determine if any tree nodes 312 remain to be traversed. If not, then it is determined that the end of the list of query nodes 312 stored at the symbol table entry 320 has been reached and the process ends. However if it is determined in the step 460 that the end of the symbol list has not been reached, the process returns to the step 452 and proceeds as described above.

It has been found that embodiments of the method 200 are substantially more time and space efficient than previous methods of XPath processing. Moreover, this efficiency is gained even with the addition of namespace processing. Namespace processing is generally not performed by state-based XPath processors because the addition of namespaces tends to cause the number of states to grow geometrically and thus to quickly become too large for practical use.

One particular embodiment of the system 100 has been able to process XPath expressions on XML documents at rates of up to 100 cycles/byte on a given hardware platform. DOM implementations running under the same conditions have generally been found to require 1000-3000 cycles/byte to evaluate the same XPath expressions. Some of that improved efficiency is attributable to more efficient use of memory. Using the token statistics and the token-by-token, as opposed to state-based, parsing of the method 200, memory use for the processing can be generally predicted thus allowing each of the tree and other data structures described above to be stored in statically allocated blocks of memory. This static allocation tends to substantially reduce memory allocation overhead that would otherwise be present from dynamic memory allocation. Moreover, storing related data together in these blocks improves memory cache usage on cache-based processors, which provides further substantial performance improvements.

Figure 5:
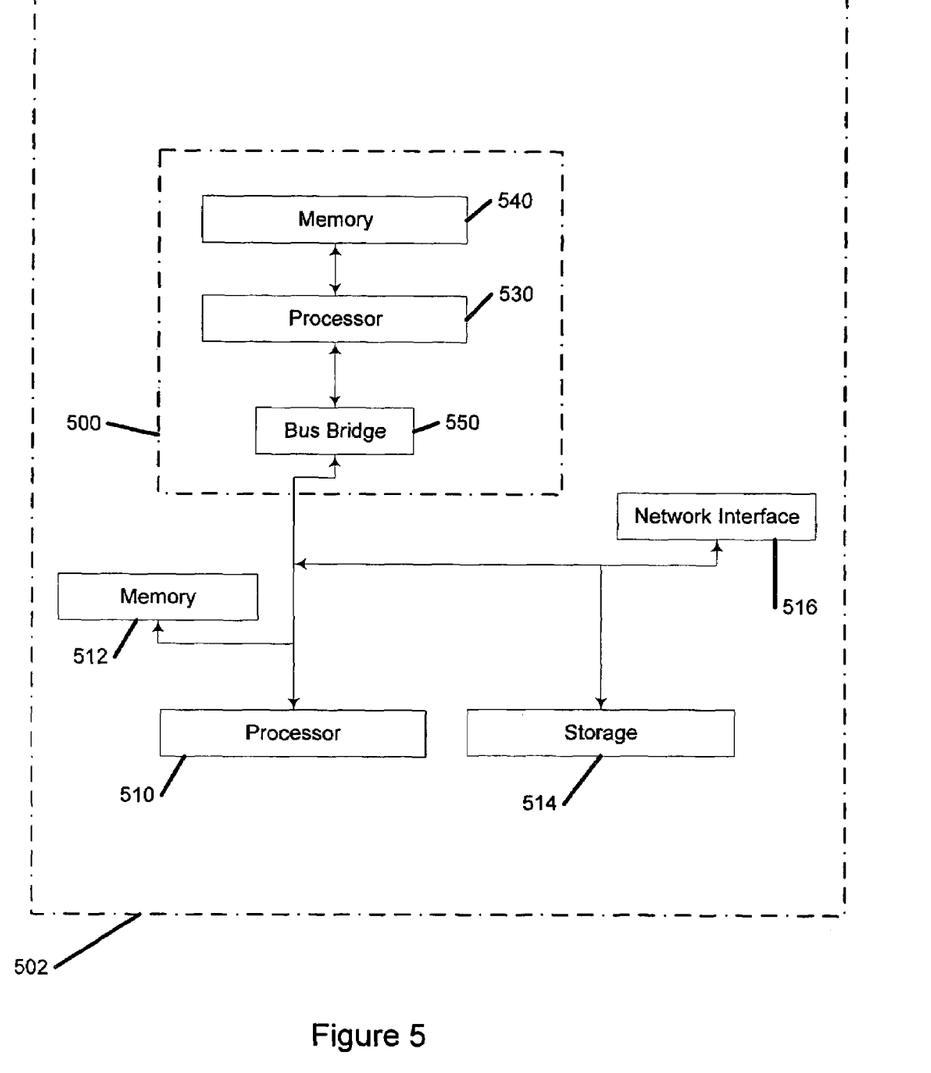
FIG. 5 is a block diagram depicting a computer system including one embodiment of a content processor configured to include the system depicted in FIG. 1.

Previously, the low efficiency of XPath methods has limited its application for processing XML data. The improved time and memory efficiency of the system 100 is particularly useful in allowing for the construction of embedded content processing systems. FIG. 5 is a block diagram depicting one embodiment of a content processing system 500 that is embedded within a server or general purpose computer system 502. The server computer 502 may include a processor 510 that is coupled to a memory 512, storage 514, and a network interface 516. The server may, for example, be configured to execute an application system that is further configured to process XML documents received via the network interface 516. Rather than consume the processor 510, the content processor 500 may process XPath queries on the XML documents.

One embodiment of the content processor 500 includes a processor 530 and memory 540. A bridge 550 may couple the content processor 500 to the server computer 502. The processor 530 and memory 540 may be configured to perform the method 200 by, for example, executing instructions that perform the method 200. The lower resource requirements of the system 100 enable construction of practical content processors 500 for application to XPath processing. In one embodiment, the content processor 500 may include other dedicated hardware components including, for example, a hardware accelerated tokenizer. In another embodiment, the processor 530 may be a general purpose processor. In other embodiments, the processor 530 may include hardware configured to perform the method 200.

In addition to enabling new hardware solutions to XPath processing, the lower resource requirements of the method 100 enables new methods of using XML data. For example, pricing an airline reservation generally requires looking for a match for a small item of data, e.g., an itinerary, in a large data set, e.g., the flight schedules and tariffs of available airlines. Because these schedules are constantly being changed by each of the airlines, maintaining a traditional pricing database may be difficult. However, because the system 100 allows a large set of XPath queries to be processed quickly, the system 100 can form the basis of a general purpose system for performing such processing.

In the airline pricing example, as each route tariff is received, the tariff may be represented as an XPath query. The system 100 may incrementally compile this XPath query into the data structure 300 for the entire database of queries. A pricing request is then transformed into an XML document. The complex matching query is thus transformed into matching the document to the XPath query set using the method 200. The tariffs corresponding to matching XPath expressions are the answers to the query.

Figure 6:
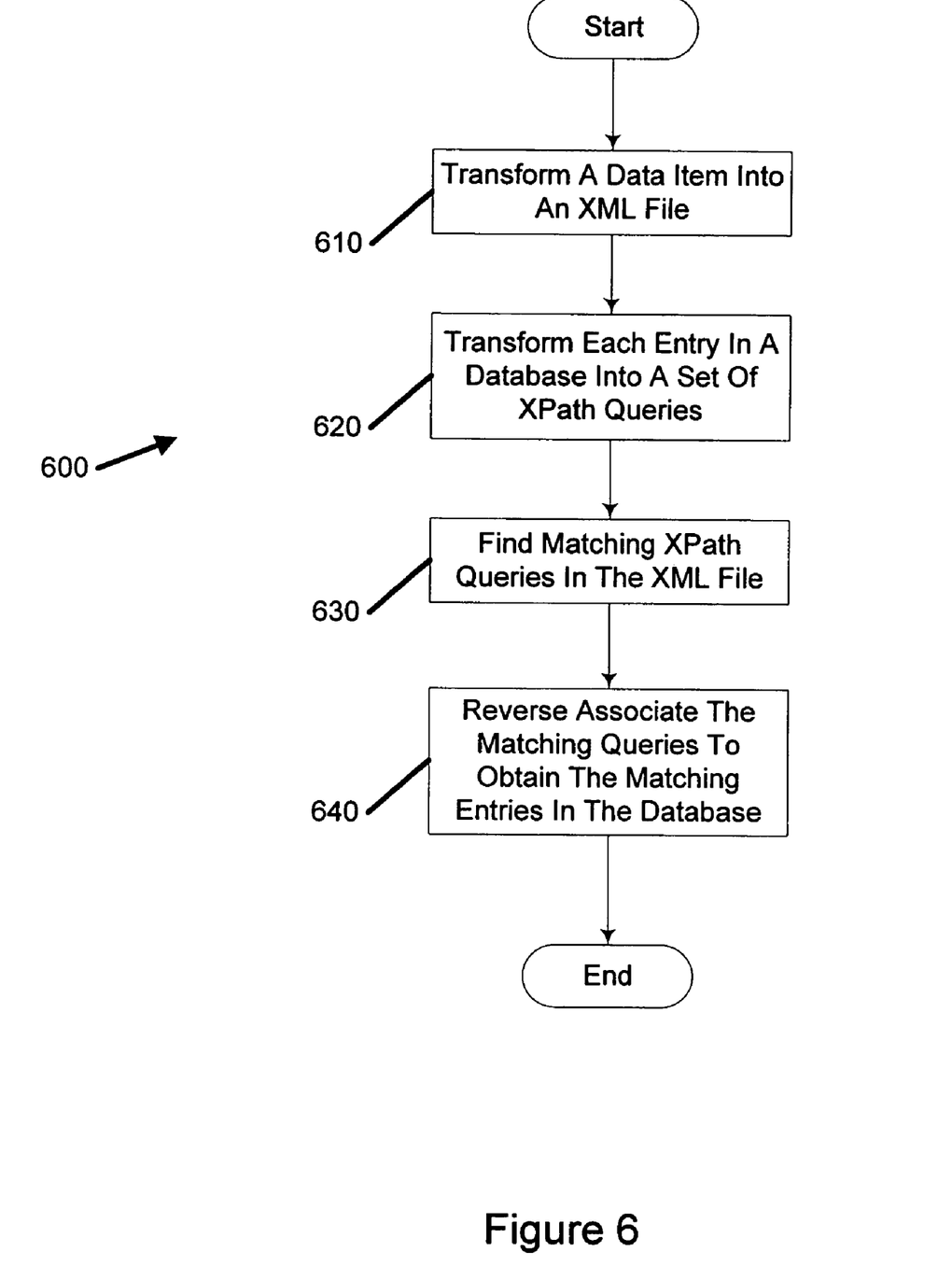
FIG. 6 is a flow chart depicting one embodiment of a method of searching a database for a matching item using the method of FIG. 2.

FIG. 6 is a flow chart depicting one generalized embodiment of a method 600 of performing queries that includes the method 200. The method 600 begins at a step 610 where a data item is transformed into an XML document. It is to be appreciated that in some embodiments, the data item may already be an XML document.

Next, at a step 620, each entry in a database is transformed into a set of XPath queries. In one embodiment, as entries are added or deleted to the database, the corresponding XPath queries are added or deleted from the set of queries.

Moving to a step 630, the XPath queries are performed on the XML document to find matching XPath queries. Preferably, the step 630 includes an embodiment of the method 200, described above. The method 600 proceeds to a step 640 where the matching XPath queries are reverse associated to the original database entry to obtain the resulting matching database entries. Next, the method 600 proceeds to an end step and terminates.

In view of the above, one will appreciate that embodiments of the invention overcome many of the longstanding problems in the art by providing an XPath processor that is both time and memory efficient. Moreover, this efficient system may be advantageously employed in compact and practical content processors for processing XML documents. In addition, new uses for XPath queries have been found for efficiently processing XML data. For example, uses include:

validation, such as of schemas or DTDs; classification; routing, including network routing, such as ISO Layer 7 routing; declarative parsing, e.g., declaring a desired syntax in terms of XPath expressions and retrieving parsed nodes by executing these queries on a file to parse the file; or data binding.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method associated with a system for processing queries in an XML document, the method comprising:
    receiving at least one query expression, wherein the at least one query expression comprises one or more components, and wherein each of the components comprises at least one symbol;
    generating at least one index and a data structure, wherein the generated data structure is indicative of hierarchical relationships between the one or more components of the received at least one query expression, the generated data structure further defining respective lists of the one or more components having corresponding symbols and the index comprising a plurality of entries with at least one of the entries for each symbol of the received at least one query expression and wherein the generated at least one index relates each symbol of the received at least one query expression in a corresponding one of the entries to a corresponding component in the respective lists defined by the generated data structure;
    generating a plurality of tokens based on contents of the XML document;
    identifying one or more tokens that matches at least one symbol by comparing the plurality of tokens with the generated at least one index;
    for each of the identified one or more tokens: retrieving a respective list of matching components corresponding to the matched at least one symbol of the generated structure and marking each matching component of the respective list of matching components; and
    outputting data indicative of a match to the received at least one query expression subsequent to marking each of the components of the received at least one query expression.

2. The method of claim 1, wherein indicating a match comprises outputting the identified at least one token and information identifying the at least one query expression.

3. The method of claim 1, wherein generating the plurality of tokens further comprises calculating at least one statistical measure of the XML document.

4. The method of claim 3, further comprising:
    preallocating a static data structure for storing the at least one index based at least partially on the at least one statistical measure.

5. The method of claim 1, wherein at least one index comprises generating at least one lookup table.

6. The method of claim 5, wherein generating at least one lookup table comprises generating at least one hash table.

7. The method of claim 1, wherein the at least one query expression comprises an XPath expression.

8. The method of claim 1, wherein
    generating the at least one index relating each symbol of the at least one query expression further comprises:
    assigning the at least one query expression to at least one of a plurality of categories defined by XML; and
    wherein generating a token further comprises:
    assigning the token to at least of a plurality of categories defined by XML; and wherein generating the index comprises:
    allocating a lookup table for each of the plurality of categories defined by the XML; and
    wherein retrieving a list of matching components further comprises retrieving the list of matching components from the respective lookup table associated with the assigned one of the plurality of categories.

9. The system of claim 1, wherein the at least one index comprises a plurality of indices corresponding to a plurality of categories defined by XML.

10. The system of claim 9, wherein the categories comprise at least one of elements, attributes, and namespaces.

11. The method of claim 1, wherein the at least one query expression comprises a plurality of XML queries and wherein the method processes the plurality of XML queries concurrently.

12. A system for processing queries of an XML document, the system comprising:
    a tokenizer configured to generate a plurality of tokens based on the contents of the XML document;
    a processor configured to:
        receive at least one query expression, wherein the at least one query expression comprises one or more components, and wherein each of the components comprises at least one symbol;
        generate at least one index and a data structure, wherein the generated data structure is indicative of hierarchical relationships between the one or more components of the received at least one query expression, the generated data structure further defining respective lists of the one or more components having corresponding symbols and the index comprising a plurality of entries with at least one of the entries for each symbol of the received at least one query expression and wherein the generated at least one index relates each symbol of the received at least one query expression in a corresponding one of the entries to a corresponding component in the respective lists defined by the generated data structure;
        generate a plurality of tokens based on contents of the XML document;
        identify one or more tokens that matches at least one symbol by comparing the plurality of tokens with the generated at least one index;
        for each of the identified one or more tokens: retrieving a respective list of matching components corresponding to the matched at least one symbol of the generated structure and marking each matching component of the respective list of matching components; and
        output data indicative of a match to the received at least one query expression subsequent to marking each of the components of the received at least one query expression.

13. The system of claim 12, wherein the generated at least one index comprises a hash table.

14. The system of claim 12, wherein processor is further configured to indicate a match by outputting the identified at least one token.

15. The system of claim 12, wherein the tokenizer is configured to generate at least one statistical measure of the contents of the XML document and wherein the processor is further configured to preallocate a static data structure for storing data related to processing the plurality of tokens based at least partially on the at least one statistical measure.

16. The system of claim 12, wherein the query expression comprises an XPath expression.

17. The system of claim 12, wherein to generate the at least one index relating each symbol of the at least one query expression the processor is further configured to:
   assign the at least one query expression to at least one of a plurality of categories defined by XML; and
   wherein generating a token based on contents of the XML document further comprises:
   assign the token to at least one of a plurality of categories defined by XML; and comprises:
   allocate a lookup table for each of the plurality of categories defined by the XML; and
   wherein to retrieve a list of matching components the processor is further configured to retrieve the list of matching components from the respective lookup table associated with the assigned one of the plurality of categories.

18. The system of claim 12 wherein the at least one index comprises a plurality of indices corresponding to a plurality of categories defined by XML.

19. The system of claim 18, wherein the categories comprise at least one of elements, attributes, and namespaces.

20. The system of claim 12, wherein the at least one query expression comprises a plurality of XML queries and wherein the processor is configured to process the plurality of XML queries concurrently.

21. The system of claim 12, wherein the system comprises one or more of an application specific integrated circuit, a field programmable gate array, and a network interface card.

22. A computer readable medium configured to store software instructions defining a process which when executed causes a processor associated therewith to perform the acts of:
   receiving at least one query expression, wherein the at least one query expression comprises at least one component, and wherein the at least one component comprises at least one symbol;
   generating at least one index and a data structure, wherein the generated data structure is indicative of hierarchical relationships between the one or more components of the received at least one query expression, the generated data structure further defining respective lists of the one or more components having corresponding symbols and the index comprising a plurality of entries with at least one of the entries for each symbol of the received at least one query expression and wherein the generated at least one index relates each symbol of the received at least one query expression in a corresponding one of the entries to a corresponding component in the respective lists defined by the generated data structure;
   generating a plurality of tokens based on contents of the XML document;
   identifying one or more tokens that matches at least one symbol by comparing the plurality of tokens with the generated at least one index;
   for each of the identified one or more tokens: retrieving a respective list of matching components corresponding to the matched at least one symbol of the generated structure and marking each matching component of the respective list of matching components; and
   outputting data indicative of a match to the received at least one query expression subsequent to marking each of the components of the received at least one query expression.

23. The computer readable medium of claim 22, wherein indicating a match comprises outputting the identified at least one token and information identifying the at least one query expression.

24. The computer readable medium of claim 22, wherein the generated at least one index comprises at least one hash table.

25. The computer readable medium of claim 22, the process further comprising:
   generating at least one statistical measure of the contents of the XML document;
   preallocating a static data structure configured to store data associated with the step of generating the at least one index, wherein the preallocating is based at least partially on the at least one statistical measure.

26. The computer readable medium of claim 25, wherein the static data structure is further configured to store data associated with the step of marking.

27. The computer readable medium of claim 22, wherein the at least one query expression comprises an XPath query.

28. A method associated with a system for searching a data item in a database, the method comprising:
   transforming each of a plurality of entries in the database into a plurality of XML queries, each query comprising an XPath expression, wherein the plurality of XML queries comprise one or more components, and wherein each of the components comprises at least one symbol;
   representing the data item as an XML document;
   generating at least one index and a data structure, wherein the generated data structure is indicative of hierarchical relationships between the one or more components of the plurality of XML queries, the generated data structure further defining respective lists of the one or more components having each symbol, wherein the generated at least one index comprises a plurality of entries with at least one of the entries for each symbol of the plurality of XML queries and wherein the generated at least one index relates each symbol of the plurality of XML queries in a corresponding one of the entries to a corresponding component in the respective lists defined by the generated data structure;
   matching, using the generated data structure, the plurality of XML queries against the XML document by comparing the XML document with the generated at least one index to identify at least a matching one of the XML queries;
   reverse associating the identified at least a matching one of the XML queries to a at least one corresponding entry of the plurality of entries in the database; and
   outputting data indicative of the at least one corresponding entry of the plurality of entries to identify a match of the at least one corresponding entry of the plurality of entries with the data item.

* * * * *